May 14, 1968   K. L. SMITH   3,383,137
TAIL GATE LATCH MECHANISM
Filed Dec. 13, 1965
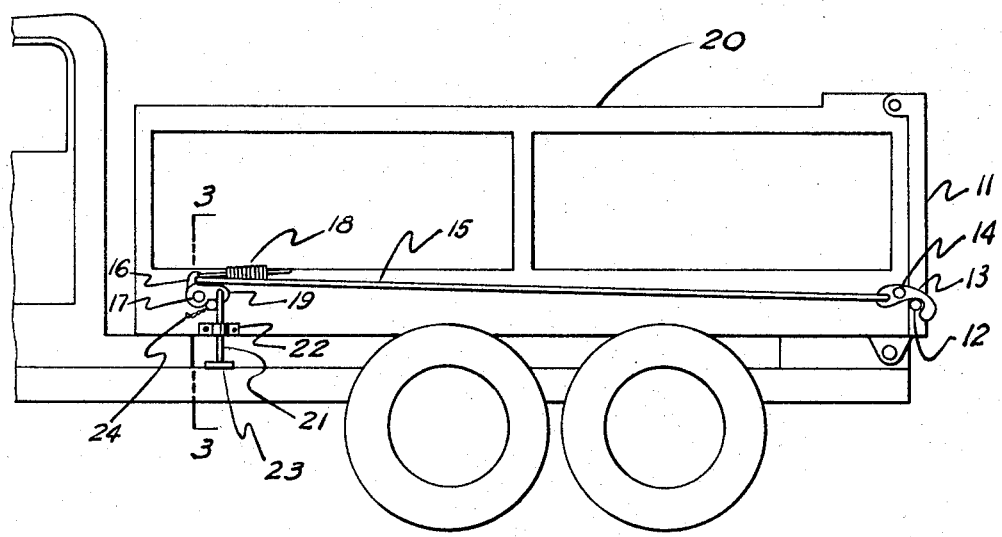
Fig 1
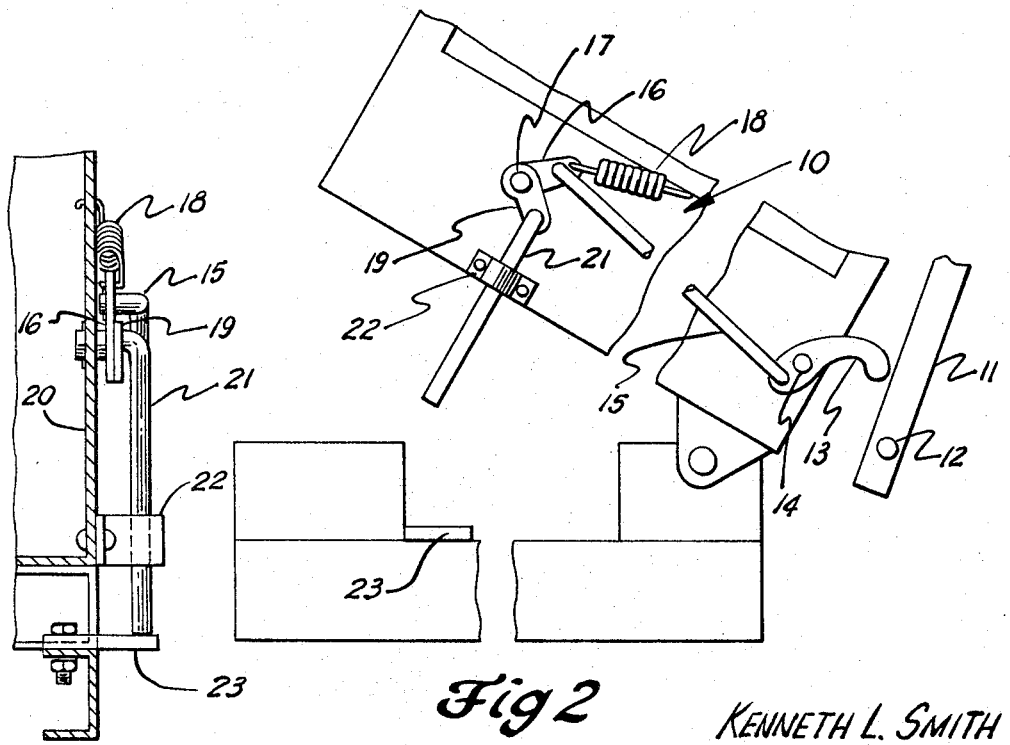
Fig 2
Fig 3
KENNETH L. SMITH
INVENTOR.
BY Arthur C. Baker
ATTORNEYS.

United States Patent Office 3,383,137
Patented May 14, 1968

3,383,137
TAIL GATE LATCH MECHANISM
Kenneth L. Smith, Sierra Vista, Ariz.
(Star Rte., Peace, Ariz. 85625)
Filed Dec. 13, 1965, Ser. No. 513,286
4 Claims. (Cl. 298—23)

ABSTRACT OF THE DISCLOSURE

A mechanism for automatically locking and unlocking the tail gate of a dump truck. An operating arm on the dump body is slidably mounted perpendicularly to the truck frame in a guide means. As the dump body is raised a spring retracts the arm and through a linkage unlatches the tail gate.

---

This invention relates to dump trucks and more particularly relates to a tail gate latch mechanism for dump trucks. The invention is shown herein as embodied in a mechanism for automatically locking and unlocking the tail gate of a conventional type of dump truck.

The conventional type of dump truck includes a dump body that is pivoted at its rear end to the rear end of the truck chassis and is adapted to have its front end lifted so that material carried in it will slide downward out of the rear end of the dump body. Across the rear end there is generally a pivoted gate, known as a tail gate. This gate is pivoted at its upper edge to the body and there is a latch means to lock it in closed position when the truck is being filled and during travel. This latch means is then released so that the tail gate can swing open as the dump body is tilted. As a matter of expediency the latch means is ordinarily operated by a lever at the front end of the dump body and the lever is usually connected to the latch means through an over-center type of linkage so that the latch will remain in locked position until the lever is positively operated to release it. Thereafter the lever must be positively operated in the other direction to re-lock the tail gate.

It is customary in the operation of such a dump truck for the operator to actuate the body tilting mechanism and thereafter to leave the cab of the vehicle and operate the control lever to release the tail gate lock so that the tail gate can swing open. Then, after the load has been dumped and the body lowered into its original position, the operator must again leave the cab and operate the control lever to lock the tail gate.

It is accordingly an object of the invention to provide an automatic control for the tail gate latch of dump trucks.

It is another object of the present invention to avoid the necessity of manually operating a control lever to lock and unlock the tail gate of a vehicle of this type.

It is a further object of the present invention to provide an automatic control for tail gate latches of dump trucks or the like which may be installed cheaply and quickly without changing any original equipment.

It is a further object of the invention to provide an automatic control for the tail gate latch of dump trucks which is of simple construction, inexpensive to manufacture, has a minimum number of parts, and is easy to use and efficient in operation.

These and other objects and advantages of the invention will be fully apparent from the following detailed description, when taken in conjunction with the annexed drawings, in which:

FIG. 1 is a fragmentary elevational view of a dump truck, with the latch mechanism of the present invention installed thereon, showing the dump body in the horizontal position with the tail gate locked;

FIG. 2 is an enlarged fragmentary elevational view showing the dump body in the upwardly sloping position with the tail gate released and open;

FIG. 3 is an enlarged fragmentary sectional view taken on line 3—3 of FIG. 1.

Referring in greater detail to the drawings in which like numerals indicate like parts throughout the several views, the latch mechanism of the present invention is designated generally by the reference numeral 10 and is shown installed upon a dump truck, the dump body being designated generally by the reference numeral 20.

As shown in the drawings a conventional type tail gate latch may be provided wherein a tail gate 11 may carry a latch pin 12, and a hook-type latch member 13 may be pivoted on the dump body 20, as shown at 14. A horizontally extending linkage 15 may interconnect latch member 13 and a lever 16, which in turn may be pivoted on the body 20, as shown at 17. A spring 18 may be provided to interconnect lever 16 and dump body 20, as clearly shown in FIG. 2. A lever 19, also pivoted at 17 on the dump body 20, may be attached to a depending lever operating arm 21, which may pass through a lever arm guide 22, to be held perpendicular to the bottom of dump body 20 and to engage a laterally extending lever arm stop 23, as more particularly shown in FIG. 3. Lever locking means may be provided and may include a bolt 24, to screw into a threaded opening in the dump body 20. Of course, when the mechanism is to be operative, lever locking means 24 will be removed.

As shown in FIG. 1, when the dump body 20 is in the horizontal position, lever operating arm 21 engages stop 23, lever 19 is maintained horizontal, lever 16 is maintained relatively vertical, spring 18 is stretched, linkage arm 15 thrust forwardly, and hook latch member 13 engages pin 12, and the tail gate 11 is closed and latched.

As shown in FIG. 1, when the front end of the dump body 20 is raised so that the dump body is in an upwardly sloping position, lever operating arm 21 is lifted and no longer engages stop 23. Consequently, spring 18 acts to rotate lever 19 and lever 16 in a clockwise direction, linkage arm 15 thrusts backwardly, and hook latch member 13 is lifted from engagement with pin 12, and the tail gate 11 is unlatched and open.

While only a preferred embodiment of the present invention has been shown and described, other embodiments are contemplated and numerous changes and modifications may be made therein without departing from the spirit of the invention as set forth in the appended claims.

What is claimed is:

1. In a dump truck having a dump body that is pivotally mounted at its rear end to the rear end of a truck frame, and said body having a pivoted tail gate to close said dump body when in the normal horizontal position, a mechanism for automatically opening and closing said tail gate of said dump body comprising in combination a laterally extending latch pin carried on the side of said tail gate adjacent its lower edge, a backwardly directed hook-like latch member pivoted on the side of said dump body adjacent its rear corner, a first lever pivoted on the side of said dump body adjacent its front corner, a linkage arm interconnecting said first lever and said latch member, a latch opening spring anchored on the side of said dump body and interconnecting said dump body and said first lever, a second lever pivoted on the side of said dump body adjacent its front corner, a depending lever operating arm carried by said second lever, a guide member carried by said dump body, said operating arm being slidably mounted in said guide means to maintain said lever operating arm perpendicular to the bottom of said dump body when said dump body is tilted, and a laterally extending stop plate carried on the side of said truck frame, to engage said depending lever operating arm when said dump body is lowered to horizontal position.

2. A mechanism as in claim 1, wherein said first lever and said second lever are one integral L-shaped member.

3. A mechanism as in claim 1, having lever locking means associated with said dump body.

4. A mechanism as in claim 1, having lever locking means associated with said dump body comprising a bolt to screw into a threaded opening in said dump body.

References Cited

UNITED STATES PATENTS

| Re. 16,643 | 5/1927 | Luce | 292—227 X |
| 2,009,466 | 7/1935 | Yeager | 298—23 |
| 2,174,956 | 10/1939 | Allison | 298—23 |
| 3,072,438 | 1/1963 | Livingston | 298—23 |

FOREIGN PATENTS

| 842,099 | 7/1960 | Great Britain. |

RICHARD J. JOHNSON, *Primary Examiner.*